(12) United States Patent
Yang et al.

(10) Patent No.: US 9,570,984 B2
(45) Date of Patent: Feb. 14, 2017

(54) CIRCUIT FOR PARALLELED POWER SUPPLY MODULE TO IMPLEMENT AUTOMATIC CURRENT-SHARING IN PROPORTION

(71) Applicant: ZTE Corporation, Shenzhen (CN)

(72) Inventors: Yundong Yang, Shenzhen (CN); Dacheng Zheng, Shenzhen (CN); Fangchun Wang, Shenzhen (CN); Yanghuai Gao, Shenzhen (CN); He Zhou, Shenzhen (CN); Bei Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 5 days.

(21) Appl. No.: 14/413,517

(22) PCT Filed: Jul. 8, 2013

(86) PCT No.: PCT/CN2013/078980
§ 371 (c)(1),
(2) Date: Jan. 8, 2015

(87) PCT Pub. No.: WO2013/185661
PCT Pub. Date: Dec. 19, 2013

(65) Prior Publication Data
US 2015/0180342 A1    Jun. 25, 2015

(30) Foreign Application Priority Data

Jul. 20, 2012  (CN) .......................... 2012 1 0252203

(51) Int. Cl.
*H02M 3/158*  (2006.01)
*H02J 7/16*   (2006.01)
*H02J 1/10*   (2006.01)

(52) U.S. Cl.
CPC .......... *H02M 3/1584* (2013.01); *H02J 1/102* (2013.01); *H02J 7/16* (2013.01); *H02M 3/158* (2013.01); *H02J 2001/106* (2013.01)

(58) Field of Classification Search
CPC .................................................. H02M 3/1584
(Continued)

(56) References Cited

U.S. PATENT DOCUMENTS 4,425,613 A    1/1984  Shelly
4,717,833 A    1/1988  Small
(Continued)

OTHER PUBLICATIONS

Supplementary European Search Report of EP Application No. 13805013, dated Sep. 15, 2015.

*Primary Examiner* — Matthew Nguyen
*Assistant Examiner* — Trinh Dang
(74) *Attorney, Agent, or Firm* — Banner & Witcoff, Ltd.

(57) ABSTRACT

A circuit for a paralleled power supply module to implement automatic current-sharing in proportion comprises: at least two power supply modules, and an output current feedback loop and an output voltage adjusting loop corresponding to each power supply module. Wherein, the output current feedback loop comprises an output current sample amplifying unit, configured to collect output current of a power supply module and amplify the collected output current into a voltage signal according to an inverse proportion of the output proportion set for each power supply module, and a current-sharing controller unit configured to adjust an output voltage of each power supply module; and the output voltage adjusting loop is configured to compare the output voltage of the current-sharing controller unit with a reference voltage, and control the output voltage of the power supply module to adjust the output current.

13 Claims, 5 Drawing Sheets

(58) Field of Classification Search
USPC .......................................................... 323/268
See application file for complete search history.

(56) References Cited

U.S. PATENT DOCUMENTS

| | | | | |
|---|---|---|---|---|
| 5,627,460 | A | * | 5/1997 | Bazinet ................... G05F 1/618 323/288 |
| 6,670,794 | B1 | * | 12/2003 | Wang .................. H02M 3/1584 323/213 |
| 2005/0017693 | A1 | * | 1/2005 | Solie ..................... H02J 7/0068 320/162 |
| 2005/0073783 | A1 | | 4/2005 | Luo et al. |
| 2010/0308654 | A1 | * | 12/2010 | Chen ................... H02M 3/1584 307/31 |

* cited by examiner

CIRCUIT FOR PARALLELED POWER SUPPLY MODULE TO IMPLEMENT AUTOMATIC CURRENT-SHARING IN PROPORTION

TECHNICAL FIELD

The present document relates to the field of the automatic current-sharing technology of the power supply module, and in particular, to a circuit for a paralleled power supply module to implement automatic current-sharing in proportion.

BACKGROUND

In order to meet the requirements of load power and reliability, the power system often adopts the distributed system to use several power supply modules in parallel. In the process of using in parallel, because the diversity of the power supply modules, the current shared on each module will be different, and then it is caused that the current stresses and the thermal stresses on each module are different, thus the reliability of the system is reduced. In order to ensure the current-sharing of the current among multiple power supplies in the system and the uniform distribution of the current stress and the thermal stress, the power supply module must support the parallel current-sharing function.

At present, the power system requires that power supplies realizing different power levels can be mixed plugging and used in parallel; although there are a lot of schemes of the automatic current-sharing in the related art, most are the current-sharing according to 1:1, which will must cause that the load of the low power module is overweight (as to the low power module itself), and the load of the high power module is too light (as to the high power module itself). Those skilled in the art should know that, as to the power supply module, no matter the load is overweight or the load is too light, neither the working condition of the power supply module is the optimum state, including but not limited to that the working efficiently does not reach the highest, the current and the voltage and the thermal stress are not under the optimum working condition and even under the situation of the abominable working condition, which will influence the life time of the power supply module and the global reliability of the power system.

If there are two modules A (1000 W) And B (2000 W) of different power levels which are mixed plugging for current-sharing, and the system load is 2000 W, and module A and module B will all be loaded 1000 W if according to 1:1 current-sharing, then module A is fully loaded, and module B is only loaded 50%. At this moment, both the two modules are not working on the optimum working point, and the efficiencies do not reach the highest; module A works at the maximum output power, and the current stress and the thermal stress of the module A are in the most abominable working condition, so the life time of the module and the reliability of the whole power system will be influenced.

SUMMARY

The embodiment of the present document provides a technology which performs the current-sharing in proportion aiming at the power supplies at different power levels, to solve the problem that the load of the high power module is too light and the load of the low power module is overweight when the power supply modules at different power levels are mixed plugging and used in parallel.

The embodiment of the present document provides a circuit for a paralleled power supply module to implement automatic current-sharing in proportion, comprising: at least two power supply modules, and an output current feedback loop and an output voltage adjusting loop corresponding to each power supply module, wherein, the output current feedback loop comprises: an output current sample amplifying unit and a current-sharing controller unit;

the output current feedback loop is configured to: feed back an output current of the power supply module to the output voltage adjusting loop corresponding to each power supply module;

the output current sample amplifying unit is configured to: collect output current of a power supply module, and amplify the collected output current into a voltage signal according to an inverse proportion of an output proportion set for each power supply module;

the current-sharing controller unit is configured to: adjust an output voltage of each power supply module; wherein, an inverted input end of the current-sharing controller unit is connected to an output signal of the output current sample amplifying unit; a non-inverted input end is connected to a current-sharing bus through a resistance; and an output end is connected to the output voltage adjusting loop; and the output voltage adjusting loop is configured to compare the output voltage of the current-sharing controller unit with a reference voltage, and control the output voltage of the power supply module to adjust the output current.

Alternatively, the output proportion set by each power supply module is a proportion of a maximum output power, a proportion of a rated power or a proportion of a maximum output current of each power supply module.

Alternatively, the output voltage adjusting loop comprises a voltage error amplifier unit, a signal generation and driver unit and a main power conversion unit; wherein, the voltage error amplifier unit is configured to that: the non-inverted input end of the voltage error amplifier unit is connected to an output voltage reference signal generated after comparing an output voltage of the current-sharing controller and the reference voltage; the inverted input end is connected to a real output voltage feedback signal of the power supply module; and an output end is connected to an input end of the signal generation and driver unit;

the signal generation and driver unit is configured to: according to an output signal of the voltage error amplifier unit, send a driving signal which controls the output voltage of the power supply module to the main power conversion unit; wherein, an input end of the signal generation and driver unit is connected to the output signal of the voltage error amplifier unit, and an output end is connected to an input end of the main power conversion unit; and the main power conversion unit is configured to: control the output voltage of the power supply module to adjust the output current.

Alternatively, the output current sample amplifying unit comprises an output current sampling unit and a current sample amplifying unit, and an input end of the current sample amplifying unit is connected to an output end of the output current sampling unit.

Alternatively, the output current sampling unit is configured to: be connected to a positive end or a negative end of an output loop of the power supply module.

Alternatively, the output voltage adjusting loop further comprises an output voltage feedback unit, configured to: feed a real output voltage of the power supply module back to the inverted input end of the voltage error amplifier unit.

Alternatively, the current-sharing controller unit is a current-sharing controller chip or an operational amplifier.

Alternatively, the output current sample unit is a two-terminal shunt, a four-terminal shunt, a current transformer or a current sensor.

Through the circuit of the present embodiment, when the power supply modules at different power levels are mixed plugging and used in parallel, the problem that the load of the high power module is too light and the load of the low power module is overweight can be solved, and each module can be made work at the optimum state and the current stress and the thermal stress of each module can be made reach the optimum balance, and the reliability of each power supply module and the whole power system can be improved.

PREFERRED EMBODIMENTS OF THE PRESENT DOCUMENT

Figure 1:
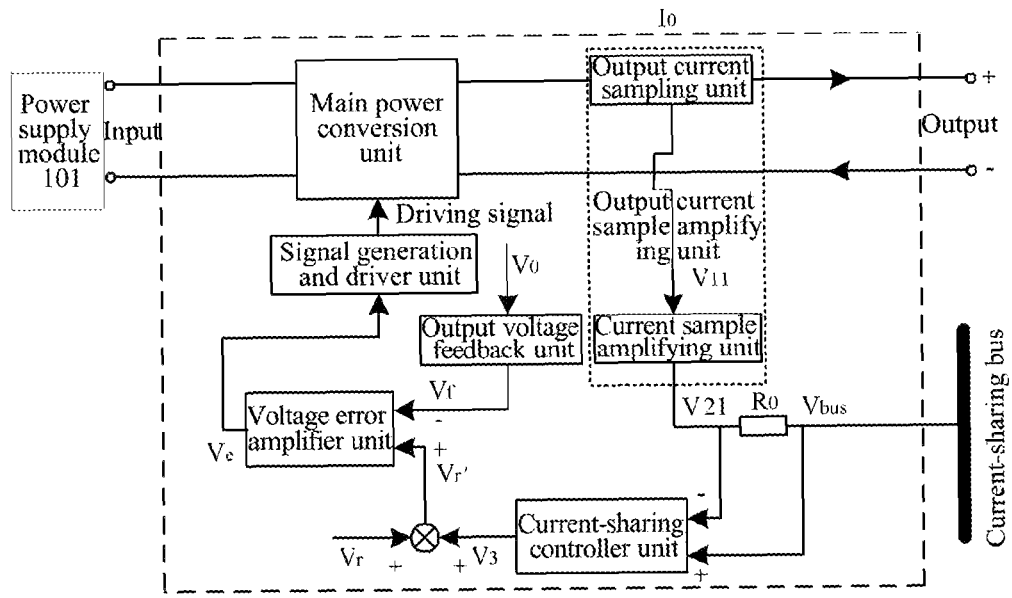
FIG. 1 is a structure diagram of a circuit for a paralleled power supply module 101 to implement automatic current-sharing in proportion according to an embodiment of the present document.
Figure 2:
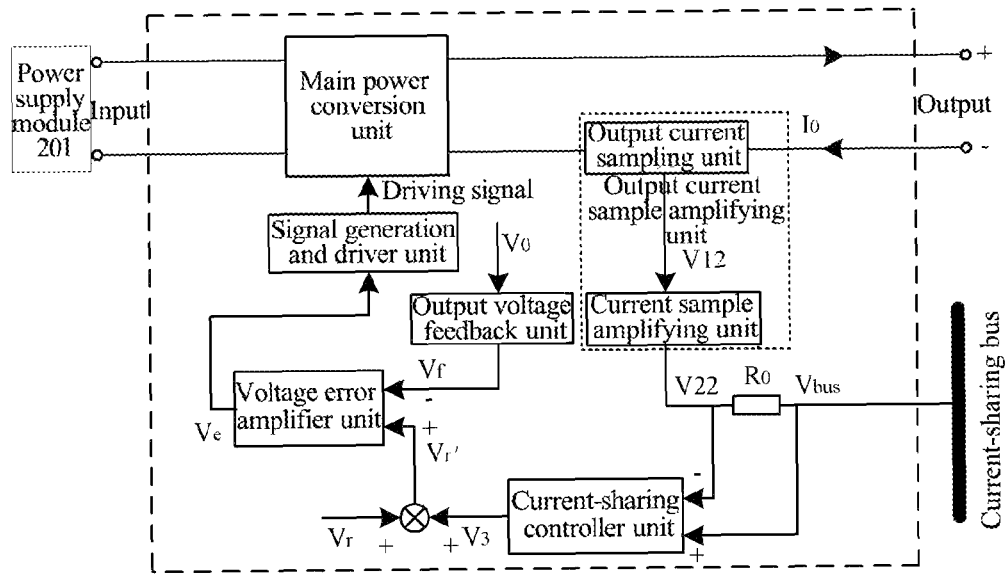
FIG. 2 is a structure diagram of a circuit for a paralleled power supply module 102 to implement automatic current-sharing in proportion according to an embodiment of the present document.

In the embodiment of the present document, appropriate hardware parameters are set for the output current sampling circuit and the current sample amplifying circuit, and output current of the power supply module at different power levels (the power levels are different, then the output currents are different) are amplified to the voltage signal according to the inverse proportion of the set proportion through the output current sampling circuit and the current sample amplifying circuit; for example, the set proportion can be the ratio of the maximum output power of every power supply module, and also can be the ratio of the maximum output current, etc., and then the real output voltage is adjusted through other controlling circuits in the apparatus of the embodiment of the present document in order to adjust the output current, to realize the purpose of the power supply modules at different power levels to perform the current-sharing according to the required proportion finally.

In order to better describe the technical scheme of the present document, the present embodiment makes specific explanation by using the work modes of two power supply modules.

As shown in FIG. 1, FIG. 2 and FIGS. 4-6, the present embodiment discloses a circuit for a paralleled power supply module to implement automatic current-sharing in proportion, including:

at least two power supply modules 101 and 201, and an output current feedback loop and an output voltage adjusting loop corresponding to each power supply module, wherein, the output current feedback loop is configured to: feed back an output current of the power supply module to the output voltage adjusting loop corresponding to each power supply module; the output current feedback loop comprises: an output current sample amplifying unit and a current-sharing controller unit;

the output current sample amplifying unit is configured to: collect output current of a power supply module, and amplify the collected output current into a voltage signal according to an inverse proportion of an output proportion set for each power supply module;

the current-sharing controller unit is configured to: adjust an output voltage of each power supply module; wherein, an inverted input end of the current-sharing controller unit is connected to the output signal of the output current sample amplifying unit; a non-inverted input end is connected to a current-sharing bus through a resistance; and an output end is connected to the output voltage adjusting loop; and the output voltage adjusting loop is configured to compare the output voltage of the current-sharing controller unit with a reference voltage, and control the output voltage of the power supply module to adjust the output current.

Wherein: the output voltage adjusting loop comprises a voltage error amplifier unit, a signal generation and driver unit and a main power conversion unit; wherein, the voltage error amplifier unit is configured in that: the non-inverted input end of the voltage error amplifier unit is connected to an output voltage reference signal generated after comparing an output voltage of the current-sharing controller and the reference voltage; the inverted input end is connected to a real output voltage feedback signal of the power supply module; and an output end is connected to an input end of the signal generation and driver unit;

the signal generation and driver unit is configured to: according to an output signal of the voltage error amplifier unit, send a driving signal to control the output voltage of the power supply module to the main power conversion unit; wherein, an input end of the signal generation and driver unit is connected to the output signal of the voltage error amplifier unit, and an output end is connected to an input end of the main power conversion unit; and the main power conversion unit is configured to: control the output voltage of the power supply module to adjust the output current.

The output current sample amplifying unit comprises an output current sampling unit and a current sample amplifying unit, and an input end of the current sample amplifying unit is connected to an output end of the output current sampling unit.

The output voltage adjusting loop further comprises an output voltage feedback unit, configured to: feed a real output voltage of the power supply module back to the inverted input end of the voltage error amplifier unit.

The output proportion set by the power supply module mentioned in the present embodiment is a ratio of a maximum output power of the two power supply modules, and certainly also can be a ratio of a maximum output current or a ratio of a rated power.

In the present embodiment, the output current sampling unit is configured to: be at a negative end or a positive end of an output loop of the power supply module.

Figure 3:
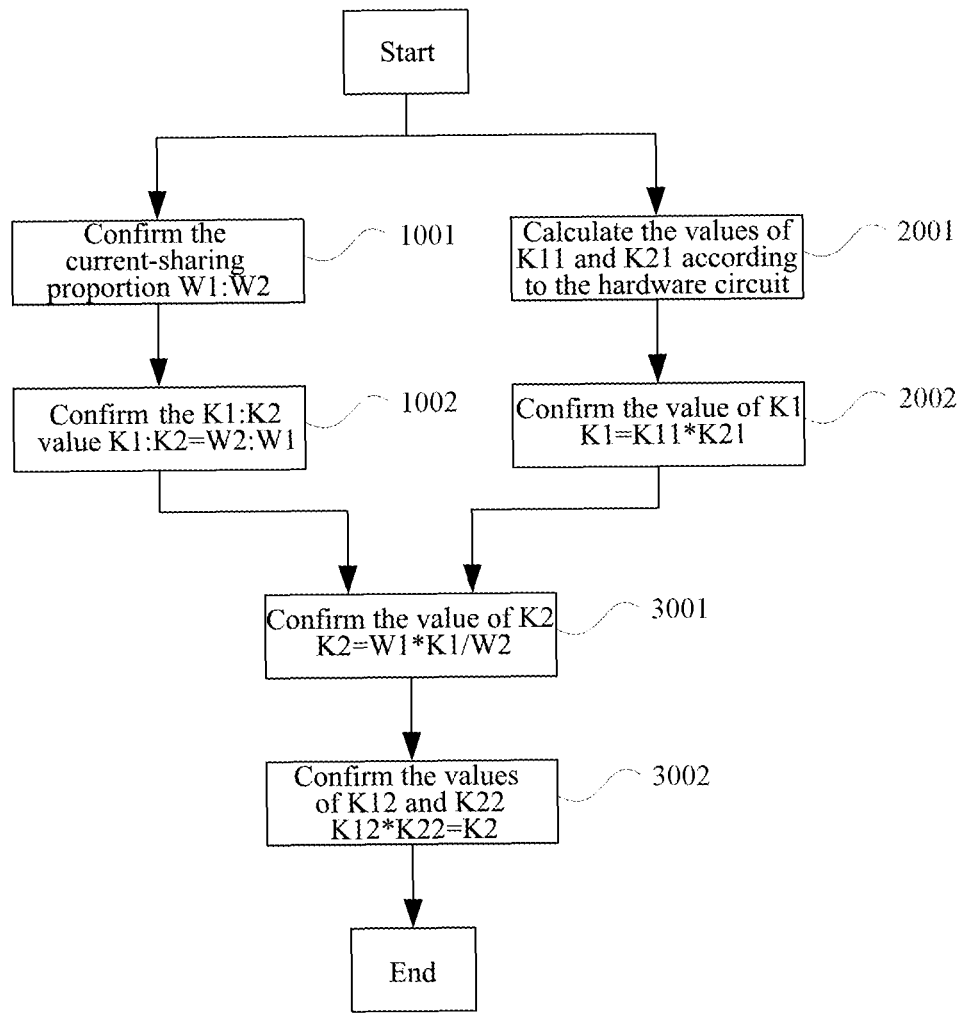
FIG. 3 is a flow chart of a method for each current sample amplifying module to confirm an amplification coefficient according to an embodiment of the present document.
Figure 4:
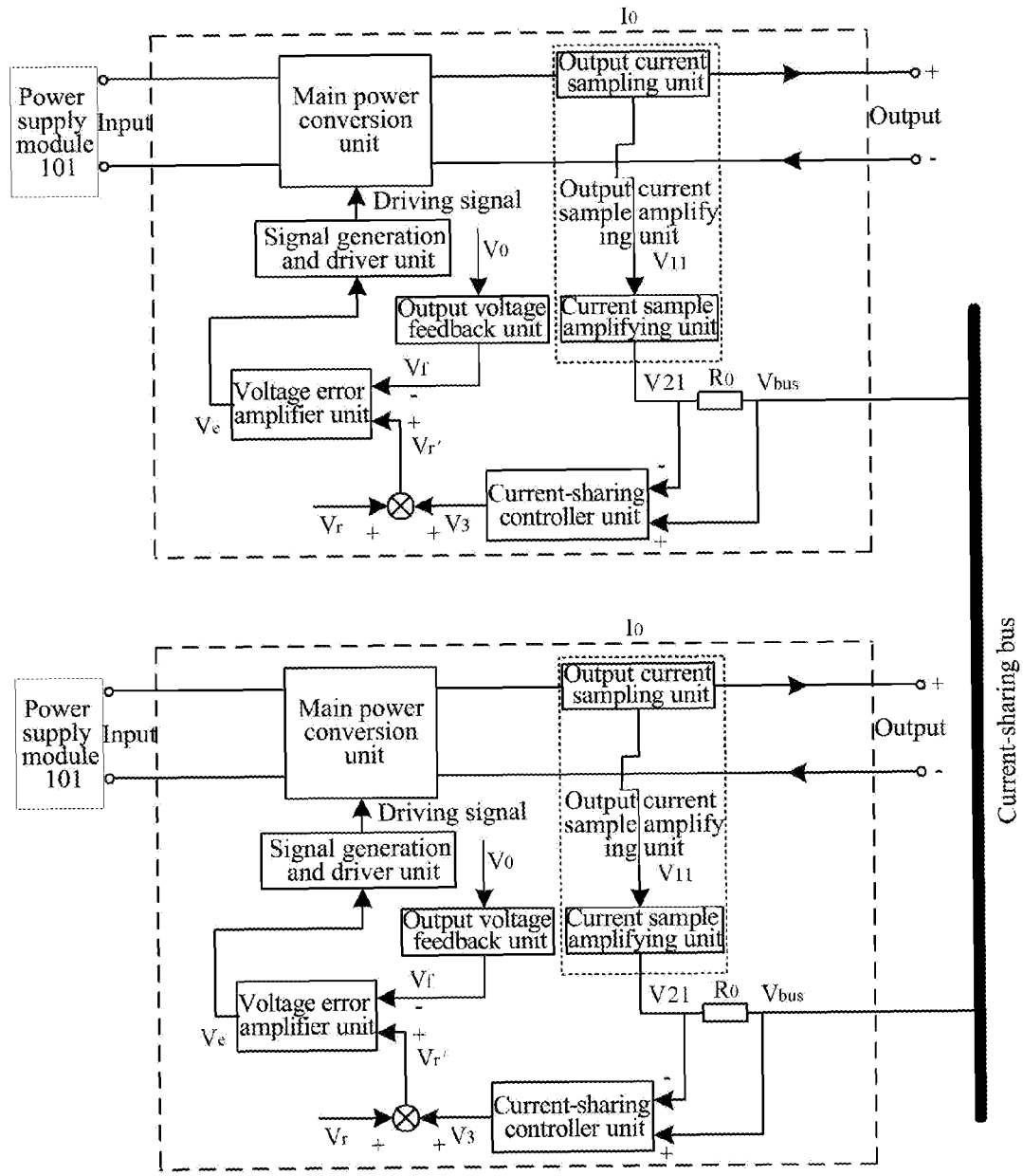
FIGS. 4-6 are structure diagrams of a circuit for paralleled power supply modules to implement automatic current-sharing in proportion according to embodiments of the present document.
Figure 5:
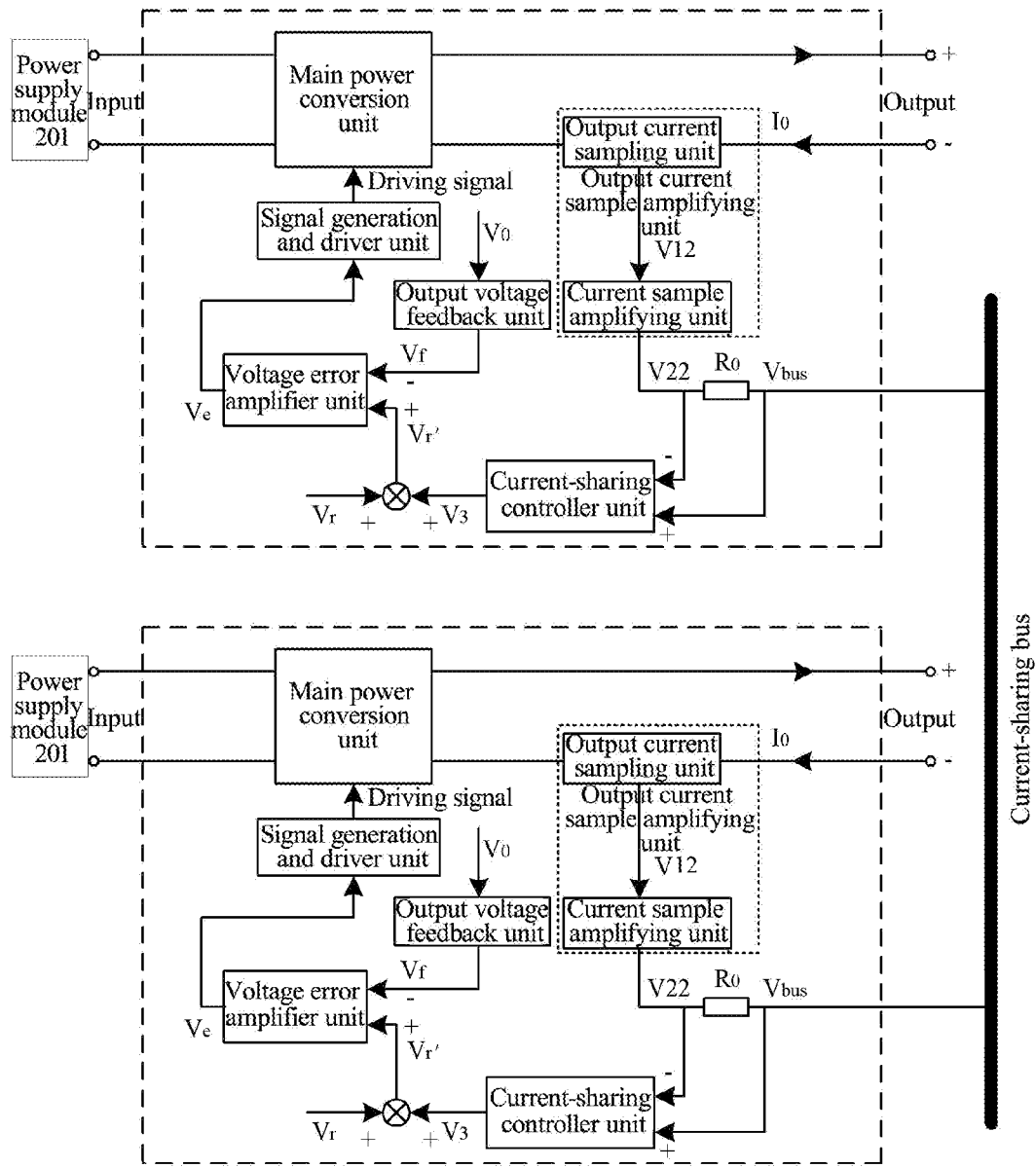
Figure 6:
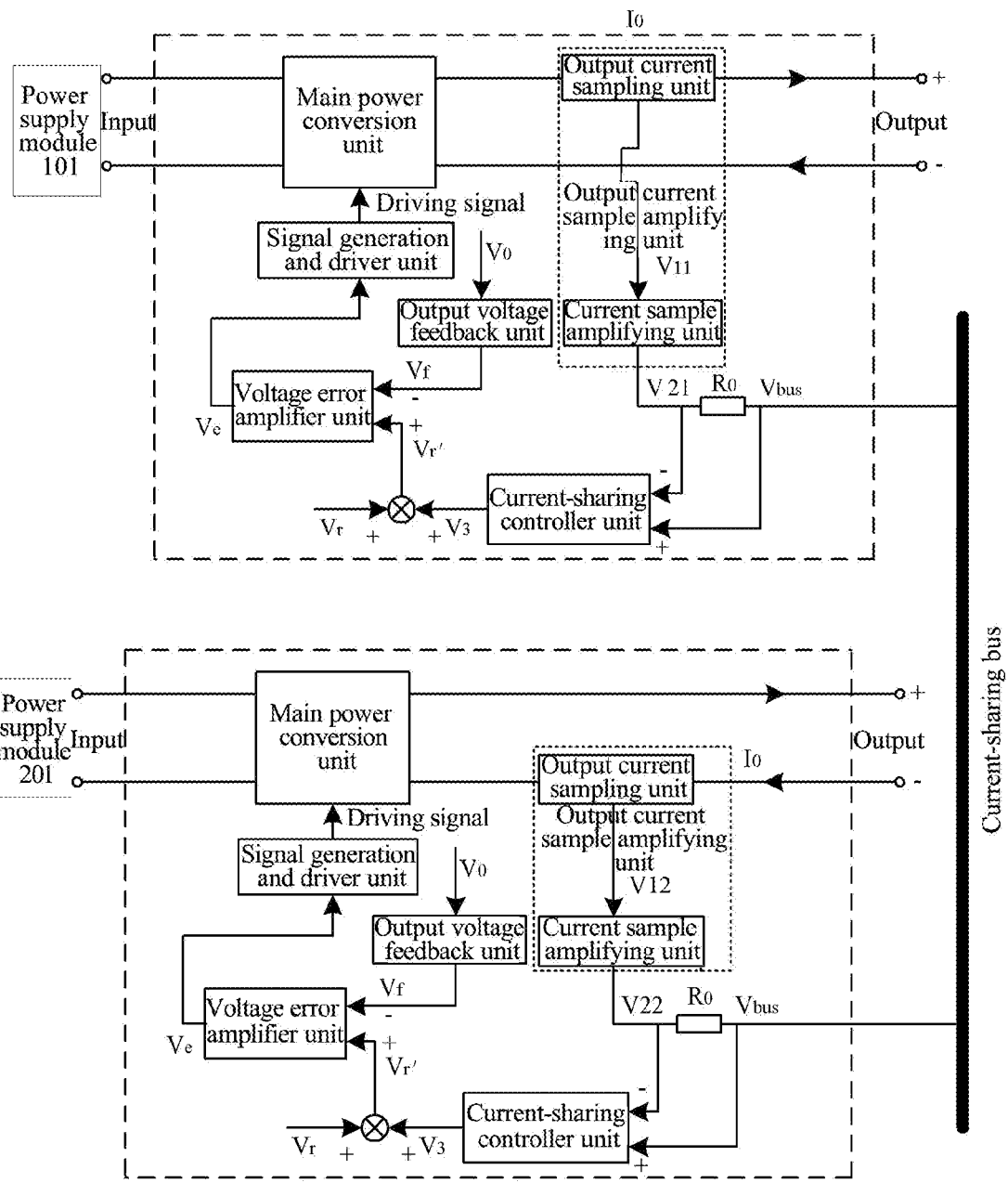

As shown in FIG. 3, the method that each current sampling module confirms the amplification coefficient of the voltage signal of the output current according to the set output proportion, such as, according to the ratio of the maximum output powers of the two power supply modules is described as follows.

In step 1001, the maximum output power of the power supply module 101 is W1, and the maximum output power of the power supply module 201 is W2; the present embodiment realizes the current-sharing in proportion by regarding the maximum output power ratio, W1:W2, as the proportion, and then during the current-sharing in parallel operation, the ratio of the output currents of the power supply module 101 and the power supply module 201 is:

$$I01/I02=W1/W2 \quad (1)$$

In formula (1): I01 is the output current of the power supply module 101 during the current-sharing in parallel operation, and I02 is the output current of the power supply module 201 during the current-sharing in parallel operation.

In step 1002, the voltage signal V11 is obtained after the output current I01 of the power supply module 101 is sampled by the output current sampling circuit 1:

$$V11=K11*I01 \quad (2)$$

In formula (2): K11 is a coefficient that the output current I01 is transformed into the voltage signal V11 through the sampling device.

The V11 is amplified into V21 through the current sample amplifying circuit 2:

$$V21=K21*V11 \quad (3)$$

In formula (3): K21 is a current sample amplifying multiple, that is, the multiple of the V11 amplified to V21.

The following formula is obtained according to formula (2) and formula (3):

$$V21=K21*K11*I01=K1*I01 \quad (4)$$

In formula (4): K1=K21*K11 is the multiple that the output current I01 is amplified into V21 by the output current sampling circuit 1 and the current sample amplifying circuit 2.

It can be obtained, according to the above-mentioned deduction process, that the output voltage signal V22 of the internal current sample amplifying circuit 2 of the power supply module 201 is:

$$V22=K22*K12*I02=K2*I02 \quad (5)$$

In formula (5): K12 is the coefficient of the output current I02 transformed into the voltage V12 through the sampling device; and K22 is the current sample amplifying multiple, that is, the multiple of the V12 amplified to V22; K2=K22*K12 is the multiple that the output current I02 is amplified into V22 by the output current sampling circuit 1 and the current sample amplifying circuit 2.

When $V21=V22$ (6)

It is obtained according to formula (4), formula (5) and formula (6):

$$I01/I02=K2/K1 \quad (7)$$

It is obtained according to formula (1) and formula (7):

$$I01/I02=W1/W2=K2/K1 \quad (8)$$

In step 2001, K11 and K21 are set through the hardware of the output current sample amplifying unit.

In step 2002, K1 is obtained according to K1=K11*K21.

In step 3001, the value of K2 is calculated through formula (8).

In step 3002, it can be known from K2=K22*K12 that, K22 is set through setting the hardware of the output current sampling unit of the power supply module 201, and the value of K12 can be obtained through calculation, thus the hardware setting of the output current sample amplifying unit of the power supply module 201 is set. The amplification coefficient of the current sample amplifying circuits of the two power supply modules and the power ratio of the two power supply modules is made to be inverse ratio by this method.

In the present embodiment, when the power supply module 101 and the power supply module 201 realize the current-sharing in proportioned W1:W2, then the outputs of the current-sharing controller units in the two power supply modules do not influence the output voltage reference Vf, that is, the non-inverted input end of the voltage error amplifier unit is not influenced by the output of the current-sharing controller unit, and the real output voltage V0 is only influenced by the output voltage reference Vf. If the power supply module 101 and the power supply module 201 do not perform the current-sharing in proportion W1:W2, then V21≠V22, and then the output voltage reference Vf is influenced by the output of the current-sharing controller unit, and the output voltage Ve of the voltage error amplifier unit changes the driving signal through the signal generation and driver unit, and then adjusts the working condition of the main power conversion unit through the driving signal, thus adjusting the output voltage of the power supply module, to achieve the purpose of the current-sharing finally.

The embodiment of the present document is explained by taking the power supply modules 101 and 201 performing the current-sharing in proportion as an example; when N modules are current-sharing in proportion in parallel operation, the corresponding design may be deducted by analogy.

The present embodiment can be generally applied to the power system where multiple power supplies are used in parallel, especially in the power system where the modules at different power levels are mixed plugging and used in parallel; the power supply module in the present embodiment can include the switching power supply, and the power system in the present embodiment can include the communication power system.

The current-sharing controller circuit described in the present embodiment includes the circuit established by the specialized current-sharing controller simulation chip and the circuit established by the operational amplifier.

The current sample device in the output current sampling circuit discussed by the apparatus of the embodiment of the present document includes a two-terminal shunt, a four-terminal shunt, a current transformer, a current sensor, etc.

The present document is explained through the embodiments. While those skilled in the art should know that the present document can have various modifications and equivalent replacement. Therefore, all of modifications, equivalents and/or variations without departing from the spirit and essence of the present document should be included in the scope of the appending claims of the present document.

INDUSTRIAL APPLICABILITY

Through the circuit of the present embodiment, when the power supply modules at different power levels are mixed plugging and used in parallel, the problem that the load of the high power module is too light and the load of the low power module is overweight can be solved, and each module can be made work at the optimum state and the current stress and the thermal stress of each module can be made reach the optimum balance, and the reliability of each power supply module and the whole power system can be improved.

The invention claimed is:

1. A circuit for a paralleled power supply module to implement automatic current-sharing in proportion, comprising:

at least two power supply modules, and an output current feedback loop and an output voltage adjusting loop corresponding to each power supply module, wherein, the output current feedback loop comprises: an output current sample amplifying unit and a current-sharing controller unit;

the output current feedback loop is configured to: feed back an output current of the power supply module to the output voltage adjusting loop corresponding to each power supply module;

the output current sample amplifying unit is configured to: collect the output current of the power supply module, and amplify the collected output current into a voltage signal wherein a proportion of each amplified voltage signal is inversed to a preset output proportion of each power supply module;

the current-sharing controller unit is configured to: adjust an output voltage of each power supply module; wherein, an inverted input end of the current-sharing controller unit is connected to an output signal of the output current sample amplifying unit; a non-inverted input end is connected to a current-sharing bus through a resistance; and an output end is connected to the output voltage adjusting loop; and the output voltage adjusting loop is configured to compare the output voltage of the current-sharing controller unit with a reference voltage, and control the output voltage of the power supply module to adjust the output current.

2. The circuit according to claim 1, wherein: the preset output proportion of each power supply module is a proportion of a maximum output power of each power supply module, a proportion of a rated power of each power supply module or a proportion of a maximum output current of each power supply module.

3. The circuit according to claim 1, wherein: the output voltage adjusting loop comprises a voltage error amplifier unit, a signal generation and driver unit and a main power conversion unit; wherein, the voltage error amplifier unit is configured in that: the non-inverted input end of the voltage error amplifier unit is connected to an output voltage reference signal generated after comparing an output voltage of the current-sharing controller and the reference voltage; the inverted input end is connected to a real output voltage feedback signal of the power supply module; and an output end is connected to an input end of the signal generation and driver unit;

the signal generation and driver unit is configured to: according to an output signal of the voltage error amplifier unit, send a driving signal to control the output voltage of the power supply module to the main power conversion unit; wherein, an input end of the signal generation and driver unit is connected to the output signal of the voltage error amplifier unit, and an output end is connected to an input end of the main power conversion unit; and the main power conversion unit is configured to: control the output voltage of the power supply module to adjust the output current.

4. The circuit according to claim 1, wherein: the current-sharing controller unit is a current-sharing controller chip or an operational amplifier.

5. The circuit according to claim 2, wherein: the output voltage adjusting loop comprises a voltage error amplifier unit, a signal generation and driver unit and a main power conversion unit; wherein, the voltage error amplifier unit is configured in that: the non-inverted input end of the voltage error amplifier unit is connected to an output voltage reference signal generated after comparing an output voltage of the current-sharing controller and the reference voltage; the inverted input end is connected to a real output voltage feedback signal of the power supply module; and an output end is connected to an input end of the signal generation and driver unit;

the signal generation and driver unit is configured to: according to an output signal of the voltage error amplifier unit, send a driving signal to control the output voltage of the power supply module to the main power conversion unit; wherein, an input end of the signal generation and driver unit is connected to the output signal of the voltage error amplifier unit, and an output end is connected to an input end of the main power conversion unit; and the main power conversion unit is configured to: control the output voltage of the power supply module to adjust the output current.

6. The circuit according to claim 3, wherein: the output current sample amplifying unit comprises an output current sampling unit and a current sample amplifying unit, and an input end of the current sample amplifying unit is connected to an output end of the output current sampling unit.

7. The circuit according to claim 3, wherein: the output voltage adjusting loop further comprises an output voltage feedback unit, configured to: feed a real output voltage of the power supply module back to the inverted input end of the voltage error amplifier unit.

8. The circuit according to claim 5, wherein: the output current sample amplifying unit comprises an output current sampling unit and a current sample amplifying unit, and an input end of the current sample amplifying unit is connected to an output end of the output current sampling unit.

9. The circuit according to claim 5, wherein: the output voltage adjusting loop further comprises an output voltage feedback unit, configured to: feed a real output voltage of the power supply module back to the inverted input end of the voltage error amplifier unit.

10. The circuit according to claim 6, wherein: the output current sampling unit is configured to: be connected to a positive end or a negative end of an output loop of the power supply module.

11. The circuit according to claim 6, wherein: the output current sample unit is a two-terminal shunt, a four-terminal shunt, a current transformer or a current sensor.

12. The circuit according to claim 8, wherein: the output current sampling unit is configured to: be connected to a positive end or a negative end of an output loop of the power supply module.

13. The circuit according to claim 10, wherein: the output current sample unit is a two-terminal shunt, a four-terminal shunt, a current transformer or a current sensor.

* * * * *